(12) United States Patent
Gyllenhammar et al.

(10) Patent No.: US 12,731,407 B2
(45) Date of Patent: Sep. 8, 2026

(54) METHOD AND SYSTEM FOR IN-VEHICLE SELF-SUPERVISED TRAINING OF PERCEPTION FUNCTIONS FOR AN AUTOMATED DRIVING SYSTEM

(71) Applicant: ZENSEACT AB, Gothenburg (SE)

(72) Inventors: Magnus Gyllenhammar, Pixbo (SE); Adam Tonderski, Västra Frölunda (SE)

(73) Assignee: ZENSEACT AB, Gothenburg (SE)

( * ) Notice: Subject to any disclaimer, the term of this patent is extended or adjusted under 35 U.S.C. 154(b) by 472 days.

(21) Appl. No.: 18/348,590

(22) Filed: Jul. 7, 2023

(65) Prior Publication Data

US 2024/0010227 A1 Jan. 11, 2024

(30) Foreign Application Priority Data

Jul. 11, 2022 (EP) .................................... 22184043

(51) Int. Cl.
*G06V 20/56* (2022.01)
*G06V 10/778* (2022.01)

(52) U.S. Cl.
CPC .......... *G06V 20/56* (2022.01); *G06V 10/7792* (2022.01)

(58) Field of Classification Search
CPC .......................... G06V 20/56; G06V 10/7792
See application file for complete search history.

(56) References Cited

U.S. PATENT DOCUMENTS

| | | | | |
|---|---|---|---|---|
| 11,656,927 | B1 * | 5/2023 | Rosenkranz | G06F 11/0751 714/26 |
| 11,684,241 | B2 * | 6/2023 | Crosby | G06N 20/00 706/12 |
| 12,236,628 | B1 * | 2/2025 | Karuppusamy | G06Q 30/06 |
| 2019/0042937 | A1 | 2/2019 | Sheller et al. | |

(Continued)

FOREIGN PATENT DOCUMENTS

| | | |
|---|---|---|
| CN | 112700639 A | 4/2021 |
| WO | 2021/055088 A1 | 3/2021 |

OTHER PUBLICATIONS

Tan et al, MGAE: Masked Autoencoders for Self-Supervised Learning on Graphs, Jan. 7, 2022 (Year: 2022).*

(Continued)

*Primary Examiner* — Kevin Ky
(74) *Attorney, Agent, or Firm* — Sage Patent Group

(57) ABSTRACT

A computer-implemented method for updating a perception function of a vehicle having an Automated Driving System (ADS) is disclosed. The ADS has a machine-learning algorithm for: generating an attention map or a feature map based on one or more ingested images and for providing one or more in-vehicle perception functions based on one or more ingested images. The method comprises obtaining one or more images of a scene in a surrounding environment of the vehicle, and updating one or more model parameters of the self-supervised machine-learning algorithm in accordance with a self-supervised machine learning process based on the obtained one or more images. The method further (Continued)

comprises generating a first output comprising an attention map or a feature map by processing the obtained one or more images by using the self-supervised machine-learning algorithm, and generating a supervisory signal for a supervised learning process based on the first output.

14 Claims, 5 Drawing Sheets

(56) References Cited

U.S. PATENT DOCUMENTS

| | | | | |
|---|---|---|---|---|
| 2019/0197236 | A1* | 6/2019 | Niculescu-Mizil | H04L 63/1425 |
| 2020/0065711 | A1* | 2/2020 | Clément | G07C 5/085 |
| 2020/0210696 | A1* | 7/2020 | Hou | G06V 10/242 |
| 2020/0249685 | A1* | 8/2020 | Elluswamy | G06V 20/588 |
| 2021/0112441 | A1 | 4/2021 | Sabella et al. | |
| 2021/0304002 | A1* | 9/2021 | George | G06N 3/0464 |
| 2021/0325901 | A1 | 10/2021 | Gyllenhammar et al. | |
| 2021/0350150 | A1 | 11/2021 | An et al. | |
| 2022/0180193 | A1* | 6/2022 | Caine | G06N 3/0895 |
| 2023/0206067 | A1* | 6/2023 | Wang | G06N 3/0455 382/155 |
| 2023/0342598 | A1* | 10/2023 | Tatsubori | G06N 3/084 |
| 2024/0010227 | A1* | 1/2024 | Gyllenhammar | G06V 10/7792 |
| 2024/0134085 | A1* | 4/2024 | Lathrop | G06N 3/04 |

OTHER PUBLICATIONS

Hess, G., et al.; "Masked Autoencoders for Self-Supervised Learning on Automotive Point Clouds"; Cornell University Library; Jul. 1, 2022; 13 pages.

Shu, L. et al.; "Kernel-Based Transductive Learning with Nearest Neighbors", Apr. 2, 2009; SAT 18th International Conference; Sep. 24-27, 2015; Austin, Texas; 12 pages.

Diao, E., et al.; "SemiFL: Communication Efficient Semi-Supervised Federated Learning with Unlabeled Clients"; Cornell University Library; Jan. 29, 202; 24 pages.

Saeed, A., et al.; "Federated Self-Supervised Learning of Multi-Sensor Representations for Embedded Intelligence"; IEEE Internet of Things Journal; Jul. 25, 2020; 11 pages.

Extended European Search Report mailed Jan. 4, 2023 for European Application No. 22184043.2, 10 pages.

Bao, H., et al.; "Beit: Bert Pre-Training of Image Transformers"; Cornell University Library; Sep. 3, 2022; 18 pages.

He, K., et al.; "Masked Autoencoders Are Scalable Vision Learners"; Cornell University Library; Dec. 19, 2021; 14 pages.

Xie, Z., et al.; "SimMIM: A Simple Framework for Masked Image Modeling"; Cornell University Library; Apr. 17, 2022; 13 pages.

Zhao, J. et al.; "iBOT: Image BERT Pre-Training with Online Tokenizer"; Cornell University Library; Jan. 27, 2022; ICLR 2022; Cornell University Library; 29 pages.

Office Action, European Patent Application No. 22184043.2, mailed May 26, 2026, 6 pages.

Akiyoshi Kurobe et al., "Audio-Visual Self-Supervised Terrain Type Recognition for Ground Mobile Platforms", Department of Science and Technology, Keio University, Yokohama, Japan, XP11839710A, Feb. 16, 2021, 10 pages.

Pedro Savarese et al., "Information-Theoretic Segmentation by Inpainting Error Maximization", XP81837388A, Dec 14, 2020, 10 pages.

* cited by examiner

20
Back-office
21
Consolidation, training and SW update engine(s)
Globally updated model parameters
Locally updated model parameters
1
1
1
10
System
30
Perceived images/data
31
Supervisory signal creation
32
Self-supervised network
Update
36
Secondary network
Post-processed output
33
Supervised learning
34
Evaluation and loss construction
Update
Output
35
Perception network 1
2
5
6
6a
6b
6c
8
10
11
12
13
14

METHOD AND SYSTEM FOR IN-VEHICLE SELF-SUPERVISED TRAINING OF PERCEPTION FUNCTIONS FOR AN AUTOMATED DRIVING SYSTEM

CROSS-REFERENCE TO RELATED APPLICATIONS

The present application for patent claims priority to European Patent Office Application Ser. No. 22184043.2, entitled "LANE KEEPING BASED ON LANE POSITION UNAWARENESS METHOD AND SYSTEM FOR IN-VEHICLE SELF-SUPERVISED TRAINING OF PERCEPTION FUNCTIONS FOR AN AUTOMATED DRIVING SYSTEM" filed on Jul. 11, 2022, assigned to the assignee thereof, and expressly incorporated herein by reference.

TECHNICAL FIELD

Embodiments disclosed herein generally relate to systems and methods for updating a perception function of an Automated Driving System (ADS). In particular, embodiments disclosed herein relate to systems and methods for updating a perception function of an Automated Driving System (ADS) by utilizing a self-supervised machine-learning algorithm to provide a supervisory signal.

BACKGROUND

During the last few years, the research and development activities related to autonomous vehicles have exploded in number and many different approaches are being explored. An 25 increasing portion of modern vehicles have advanced driver-assistance systems (ADAS) to increase vehicle safety and more generally road safety. ADAS—which for instance may be represented by adaptive cruise control (ACC) collision avoidance systems, forward collision warning systems, etc.—are electronic systems that may aid a vehicle driver while driving. Today, there is ongoing research and development within a number of technical areas associated to both the ADAS and Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle in traffic, as well as forming an awareness of the surroundings. While the ADS has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, obstacles, free-space areas, relevant signage, and so forth.

Machine Learning (ML), such as Deep Learning (DL), is a promising technology in the area of perception, for example in order to detect and classify objects in images, video streams and/or LIDAR point clouds. However, the problem with many deep neural networks is that they quickly reach some level of performance (maturity), and that extremely large amounts of data are required to get further improved performance. Annotating millions of images is expensive, and hence many initiatives are taken in the autonomous driving field to reduce this cost through semi-automated annotation and learning efficiently from annotated data. However, even with these advances it is still a very costly process.

There is accordingly a need in the art for new solutions for facilitating development of ADS functions, and in particular for the ADS's perception functionality, in order to continuously be able to provide safer and better performing systems. As always, the improvements shall preferably be made without significant negative impact on the size, power consumption and cost of the on-board system or platform.

SUMMARY

The present invention seeks to mitigate, alleviate or eliminate one or more of the above-identified deficiencies and disadvantages in the prior art to address various problems relating to the development of ADS functions, and in particular for the development of an ADS's perception functionality.

Various aspects and preferred embodiments of the disclosed invention are defined below and in the accompanying independent and dependent claims.

According to a first aspect of the present invention, there is provided a computer-implemented method for updating a perception function of a vehicle having an Automated Driving System (ADS). The ADS has a self-supervised machine-learning algorithm configured to generate an output (e.g., attentions or features) based on one or more ingested images and a machine-learning algorithm for an in-vehicle perception module trained to provide one or more in-vehicle perception functions based on one or more ingested images. The method comprises obtaining one or more images of a scene in a surrounding environment of the vehicle, and updating one or more model parameters of the self-supervised machine-learning algorithm in accordance with a self-supervised machine learning process based on the obtained one or more images. The method further comprises generating a first output by processing the obtained one or more images by means of the self-supervised machine-learning algorithm, and generating a supervisory signal for a supervised learning process based on the first output. Furthermore, the method comprises updating one or more model parameters of the machine-learning algorithm for the in-vehicle perception module based on the obtained one or more images and the generated supervisory signal in accordance with the supervised learning process.

According to a second aspect of the present invention, there is provided a computer program product comprising instructions which, when the program is executed by a computing device, causes the computer to carry out the method according to any one of the embodiments disclosed herein. With this aspect of the invention, similar advantages and preferred features are present as in the other aspects of the invention.

According to a third aspect of the present invention, there is provided a (non-transitory) computer-readable storage medium comprising instructions which, when executed by a computing device, causes the computer to carry out the method according to any one of the embodiments disclosed herein. With this aspect of the invention, similar advantages and preferred features are present as in the other aspects of the invention.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM).

Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a fourth aspect of the present invention, there is provided a system for updating a perception function of a vehicle having an Automated Driving System (ADS). The ADS has a self-supervised machine-learning algorithm configured to generate an output (e.g., attentions or features) based on one or more ingested images and a machine-learning algorithm for an in-vehicle perception module trained to provide one or more perception functions based on one or more ingested images. The system comprises control circuitry configured to obtain one or more images of a scene in a surrounding environment of the vehicle, and update one or more model parameters of the self-supervised machine-learning algorithm in accordance with a self-supervised machine learning process based on the obtained one or more images. The control circuitry is further configured to generate a first output by processing the obtained one or more images by means of the self-supervised machine-learning algorithm, and generate a supervisory signal for a supervised learning process based on the first output.

Furthermore, the control circuitry is configured to update one or more model parameters of the machine-learning algorithm for the perception module based on the obtained one or more images and the generated supervisory signal in accordance with the supervised learning process. With this aspect of the invention, similar advantages and preferred features are present as in the other aspects of the invention.

According to a fifth aspect of the present invention, there is provided a vehicle comprising one or more sensors configured to capture images of a scene in a surrounding environment of the vehicle, and a system for updating a perception function of the of vehicle according to any one of the embodiments disclosed herein. With this aspect of the invention, similar advantages and preferred features are present as in the other aspects of the invention.

An advantage of some embodiments is that efficient and effective incorporation of new data into the trained machine-learning algorithms used for detection and tracking tasks in ADS-equipped vehicles is achievable with increased performance and reliability as a result.

An advantage of some embodiments is that capturing of rare scenarios (corner cases) experienced by the vehicles in the training of the machine-learning algorithms used for perception functionality is facilitated.

An advantage of some embodiments is that automatic training of machine-learning algorithms used for perception functionality in ADS-equipped vehicles is enabled, also for novel data, which is particularly relevant and useful during e.g. Operational Design Domain (ODD) expansion.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
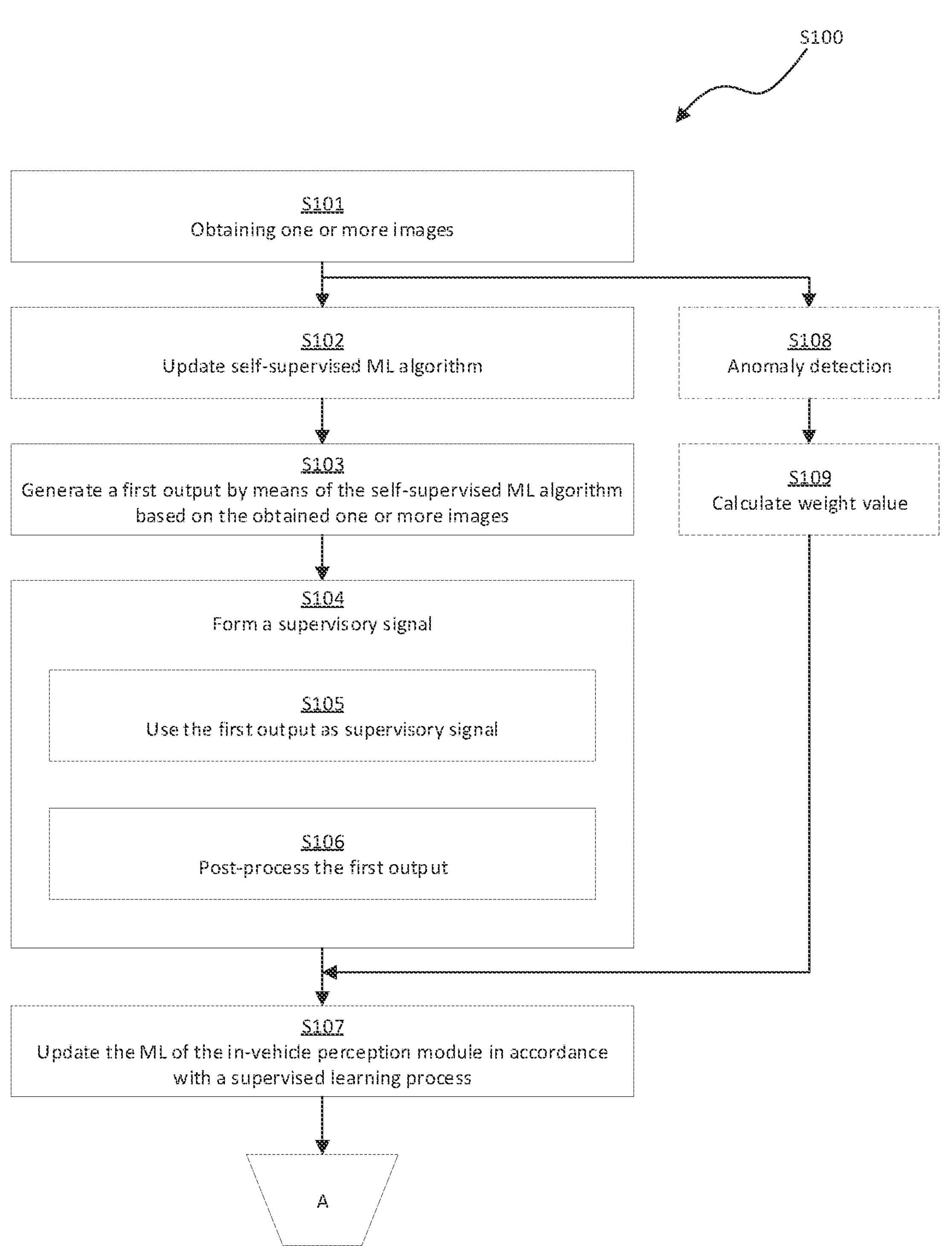
FIG. 1 is a schematic flowchart representation of a method for updating a perception function of an ADS-equipped vehicle in accordance with some embodiments.

In the following detailed description, embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs), Field Programmable Gate Arrays (FPGA) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

It is also to be understood that the terminology used herein is for purpose of describing particular embodiments only, and is not intended to be limiting. It should be noted that, as used in the specification and the appended claim, the articles “a”, “an”, “the”, and “said” are intended to mean that there are one or more of the elements unless the context clearly dictates otherwise. Thus, for example, reference to “a unit” or “the unit” may refer to more than one unit in some contexts, and the like. Furthermore, the words “comprising”, “including”, “containing” do not exclude other elements or steps. It should be emphasized that the term “comprises/comprising” when used in this specification is taken to specify the presence of stated features, integers, steps, or components. It does not preclude the presence or addition of one or more other features, integers, steps, components, or groups thereof. The term “and/or” is to be interpreted as meaning “both” as well and each as an alternative. The term “obtaining” is herein to be interpreted broadly and encompasses receiving, retrieving, collecting, acquiring, and so forth.

It will also be understood that, although the term first, second, etc. may be used herein to describe various elements or features, these elements should not be limited by these terms. These terms are only used to distinguish one element from another. For example, a first signal could be termed a second signal, and, similarly, a second signal could be termed a first signal, without departing from the scope of the embodiments. The first signal and the second signal are both signals, but they are not the same signal.

In general, large volumes of training data are required in order to develop machine-learning algorithms to reach an adequate performance level for industrial purposes. This is particularly the case for “vision tasks” (i.e. perception functions), such as object detection and object classification, which commonly uses deep neural networks.

The need for large volumes of training data is even further amplified in the Autonomous Driving field, as the requirements for reaching the necessary integrity and performance levels before one can deploy an ADS in the field (i.e. in traffic), are immense. However, one general challenge that is associated with the acquisition of large volumes of training data for ADS development purposes such as the generation of annotated datasets is that they are known to be costly and/or labour-intensive. Other challenges that need to be addressed are for example related to bandwidth requirements, data storage capacity, and data privacy due to the consequential need of transmitting large, and potentially sensitive, datasets between entities.

Federated learning (FL) is a scheme where a “global” or “central” model is consolidated from “local” models trained at the edge. This is prevalent in “voice assistants” and “typing models” for e.g. smart phones. In the present context, the vehicles constitute the edge devices or nodes, while one or more remote servers may constitute the central server responsible for aggregating or consolidating the model updates from each of the edge devices. This would be referred to as centralized federated learning scheme. However, in some embodiments the need for a central entity may be omitted and the edge devices (e.g. a fleet of vehicles) may be configured to coordinate themselves to obtain the global model, as so called decentralized federated learning scheme. In the following the description is mainly given in reference to a centralized federated learning scheme. It is however presumed that those skilled in the art would readily appreciate how to implement the teachings herein to a decentralized federated learning scheme, and that the scope conveyed by the invention disclosed herein encompasses such a realization. It should be noted that the term “global” does not necessarily imply “worldwide”, in the present context, but should instead be construed as something that is “shared” among a plurality of “local” entities.

A challenge that is associated with the use of Federated Learning is that the local models can only be trained if it is possible to construct a loss function (may also be referred to as a cost function). This challenge is even more prominent for supervised training in the Autonomous Driving field as it requires annotated datasets, which are as mentioned, difficult to obtain in large enough quantities. These requirements results in an almost impossible situation because it may be impossible to share the data (due to bandwidth requirements and data privacy/security reasons), and because it is generally infeasible to elicit accurate annotations of all data collected in the vehicles.

Recently, a new paradigm, using “self-supervised learning”, has been proposed to, at least partly, alleviate the need for annotated data in the training process of machine-learning algorithms. Through this process the machine-learning algorithm of a perception function can be trained by using images with no need for annotations. Further background and details to the “self-supervised” learning is for example provided in Bao, H., et al. (2021), *BEiT: BERT Pre-Training of Image Transformers*; He, K., et al. (2021), *Masked Autoencoders Are Scalable Vision Learners*; Xie, Z., et al. (2021), *SimMIM: A Simple Framework for Masked Image Modeling*; Zhou, J. et al. (2021). iBOT: Image BERT Pre-Training with Online Tokenizer.

However, for multiple reasons one might not want to rely on self-supervised machine-learning algorithms or transformer-based networks (as the above-mentioned examples), as basis for decisions and various operations of an ADS. This may for example be because the accuracy and computational efficiency of these self-supervised machine-learning algorithms may be questioned in comparison with conventional machine-learning algorithms (e.g. Convolutional Neural Networks, CNNs) used for ADS perception functionality. Furthermore, the compatibility with approved hardware (HW) architectures may also be an issue.

However, the present inventors that these self-supervised machine-learning networks may be still be utilized in the field of Automated Driving Systems to provide the technical benefit of improving the on-board perception functions (i.e. the “production system”) in an efficient and reliable manner. In more detail, it is herein proposed to leverage this paradigm of “self-supervision” to construct a supervisory signal to the “production system” (e.g. a CNN-based perception function). In short, some embodiments comprise machine-learning algorithms that are trained through self-supervised learning using the sensory output (e.g. camera images, LiDAR images, etc.) from the vehicle’s on-board sensors to generate an output that is subsequently used to form a supervisory signal (i.e. a form of ground-truth). This formed supervisory signal is then used in a supervised learning process to train the machine-learning algorithm of the in-vehicle perception module (may also be referred to as the “production system”). In other words, the output of the self-supervised machine-learning algorithm is used, either directly or indirectly, as a supervisory signal to perform local updates of a perception function of the production system. Then, in some embodiments, the updated networks (or parts thereof) may be transmitted to a central system where a plurality of local updates may be consolidated and pushed to the vehicles in a global software update procedure.

Accordingly, by means of the technology disclosed herein, one can efficiently incorporate the various scenes and scenarios that the vehicles of a fleet are exposed to during normal operation in the training of the production network without the need for either transmitting huge datasets or annotating the data collected by each vehicle. Consequently, an efficient and automated process for improving the performance of the perception functionality of ADS-equipped vehicles is readily achievable. Moreover, an efficient expansion of the production network's operational capability into new regions and new use cases (i.e. Operational Design Domain expansion) at a faster pace is readily achievable.

An Operational design domain (ODD) is to be understood as a description of the operating domains in which an automated or a semi-automated driving system (i.e. AD or ADAS) is designed to function, including, but not limited to, geographic, roadway (e.g. type, surface, geometry, edges and markings), environmental parameters, connectivity, surrounding objects, and speed limitations. That is, the production network of the ADS may be associated with a specific environmental scenario and only configured to operate within an environment fulfilling a set of "scenario parameters", example scenarios are traffic jams, highway/expressway cruising, etc. The ODD may further define an allowable exposure rate to driving scenarios and their dynamics (e.g. traffic lights, intersections, jaywalkers, snow, ice, cut-ins, large animals, etc.). The "scenario parameters" may for example be obtained from sensor data from one or more vehicle-mounted sensors or communication data obtained from a remote server, or another vehicle via a Vehicle-to-Vehicle (V2V) communication protocol. The scenario parameters may for example be type of road, weather data, speed limitations, traffic density, number of available lanes, presence of road work, and so forth.

Thus, an advantage of some embodiments is that the training of machine-learning algorithms for providing perception functionality in ADS-equipped vehicles may be rendered more cost-effective and less labour-intensive as compared to the known prior art.

An advantage of some embodiments is that automated training of perception networks for use in ADS-equipped vehicles is made possible.

An advantage of some embodiments is that is that the training of machine-learning algorithms for providing perception functionality in ADS-equipped vehicles may be rendered more efficient in general as the need for transferring huge datasets, which may contain personal data, may be alleviated, which may not even be permitted in some countries.

Some embodiments further provide the advantage of increasing the possibility to capture rare cases (may also be referred to as corner cases) that can be incorporated in the training of the production network, even further increasing the performance at a higher pace as compared to the known prior art.

The machine-learning algorithms (may also be referred to as machine-learning models, neural networks, and so forth) are implemented in some embodiments using publicly available suitable software development machine learning code elements, for example, such as those which are available in PyTorch, Keras and TensorFlow or in any other suitable software development platform, in any manner known to be suitable to someone of ordinary skill in the art.

Figure 2:
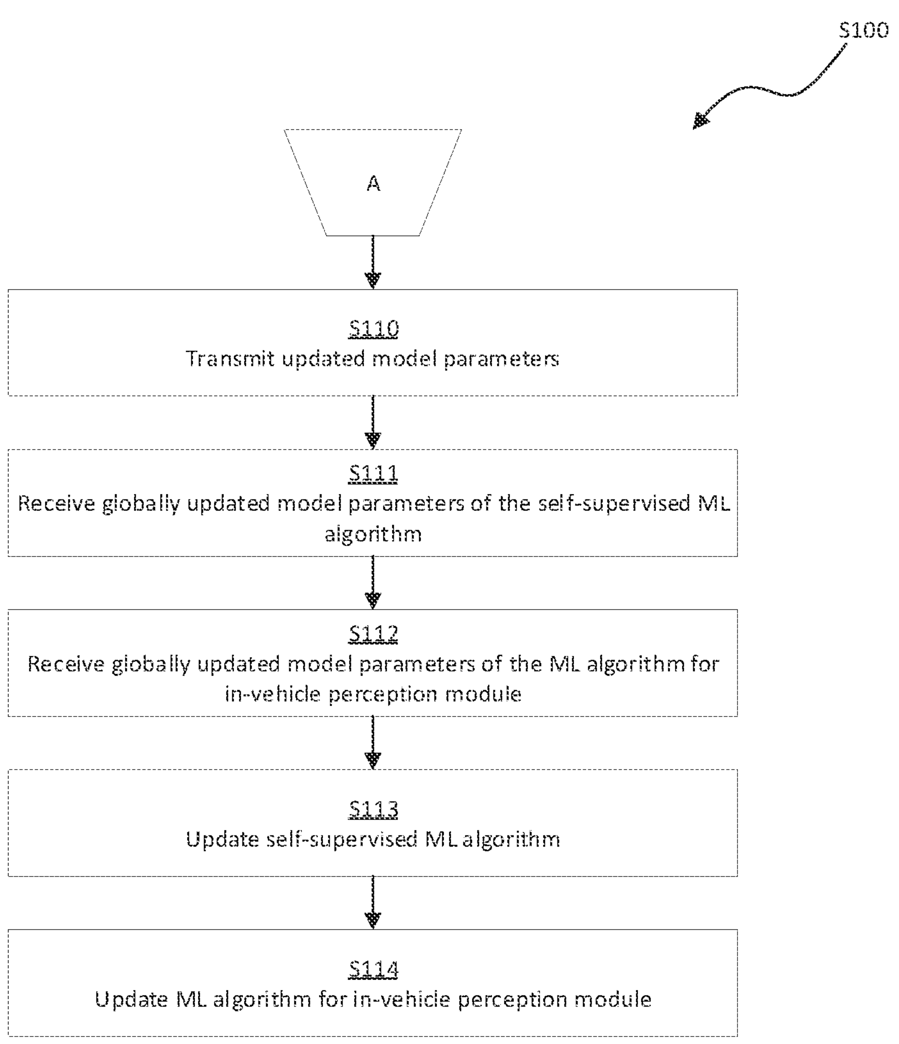
FIG. 2 is a schematic flowchart representation of a method for updating a perception function of an ADS-equipped vehicle in accordance with some embodiments.

FIGS. 1 and 2 is a schematic flowchart representation of a method S100 for updating a perception function of a vehicle having an Automated Driving System (ADS) in accordance with some embodiments. In more detail, the ADS has a self-supervised machine-learning algorithm configured to generate an output based on one or more ingested images and a machine-learning 35 algorithm for an in-vehicle perception module (i.e. a "production network") trained to provide one or more in-vehicle perception functions based on one or more ingested images. The output from the self-supervised machine-learning algorithm may for example be in the form of attentions (e.g. attention maps), features (e.g. feature maps), depth values, or any other suitable output as readily understood by someone of ordinary skill in the art.

The method S100 is preferably a computer-implemented method S100, performed by a processing system of the ADS-equipped vehicle. The processing system may for example comprise one or more processors and one or more memories coupled to the one or more processors, wherein the one or more memories store one or more programs that perform the steps, services and functions of the method S100 disclosed herein when executed by the one or more processors.

The method S100 comprises obtaining S101 one or more images of a scene in a surrounding environment of the vehicle. The obtained S101 one or more images may for example be images captured by a vehicle-mounted camera. However, in some embodiments the one or more images may be in the form of LiDAR images or RADAR images. Moreover, the images may be a sequence of images (i.e. a video feed) or single images.

Further, the method S100 comprises updating S102 one or more model parameters of the self-supervised machine-learning algorithm in accordance with a self-supervised machine learning process based on the obtained one or more images. The "one or more model parameters" may for example be understood as one or more network weights and/or biases as readily appreciated by the skilled person in the art.

A "self-supervised machine-learning algorithm" is in the present context to be understood as a machine-learning algorithm (e.g. an artificial neural network) that does not require labelled or annotated data to learn. In some embodiments, the self-supervised machine-learning algorithm is an autoencoder (AE), such as a Masked Autoencoder (MAE), or any suitable transformer-based network. In some embodiments, the self-supervised machine-learning algorithm is trained by manipulating (e.g. withholding) parts of an image and instructing the algorithm to reconstruct the manipulated image as part of its learning process. The reconstructed image is subsequently compared to the original image to create a loss function, which is used to update the model parameters (e.g. network weights and/or biases), as known in the art. The manipulation of the image(s) may for example be performed through masking, adding noise to the image, or a similar methodology as readily understood by a person skilled in the art. However, in some embodiments, the input data does not need to be manipulated in order to train the machine-learning algorithm but may instead be trained with a "raw input", such as for example in a conventional autoencoder. Thus, in some embodiments the self-supervised machine-learning algorithm may comprise an unsupervised machine-learning algorithm.

The method S100 further comprises generating S103 a first output by processing the obtained one or more images by means of the self-supervised machine-learning algorithm. As mentioned, the first output may for example be in the form of an attention map, a feature map, a depth map, etc. In some embodiments, the attention map comprises a scalar matrix representing the relative importance of layer activations at different 2D spatial locations with respect to a target task i.e., an attention map is a grid of numbers that indicates what 2D locations are important for a task. In the present context, the target task (or just simply the task) may be understood as the perception function of the ML algorithm of the in-vehicle perception module. For example, important locations correspond to bigger numbers and can be depicted in red in a heat map. A "feature map" (may also be referred to as an "activation map") can be understood as the output of one filter applied to the previous layer of a neural network, i.e. a mapping of where a certain kind of feature is found in an image.

Further, the method S100 comprises generating S104 a supervisory signal for a supervised learning process based on the first output. Here, the generated S103 first output may be used directly to form the supervisory signal or indirectly by utilizing a secondary ML algorithm to ingest the first output and generate a second output (e.g. object classifications, bounding boxes, depth/distance maps, etc.) that will form the supervisory signal (c.f. the architectures depicted in FIGS. 3 and 4 respectively).

The method S100 further comprises updating S107 one or more model parameters of the machine-learning algorithm for the in-vehicle perception module based on the obtained one or more images and the generated supervisory signal in accordance with the supervised learning process. Accordingly, obtained S101 one or more images forms the input data or input object and the supervisory signal forms the desired output onto which the machine-learning algorithm for the in-vehicle perception module is being trained to map the input data.

As a concrete example, the method S100 and architecture as disclosed herein, may be used to train a machine-learning algorithm for the in-vehicle perception module in the form of an instance segmentation network, i.e. a network that detects objects in an image and provides a pixel-wise mask for these objects. To create a loss function (cost function) for the instance segmentation network the objects detected by the instance segmentation network are compared with e.g. attention maps (as output by the self-supervised ML algorithm) for all pixels in the object mask. The instance segmentation network may accordingly be updated to maximize the overlap between the two (i.e. between the objects detected by the instance segmentation network and the attention maps).

Reverting back to the generation S104 of the supervisory signal, in some embodiments, the generated S104 supervisory signal comprises the generated S103 first output, and the obtained 101 one or more images and the generated S104 supervisory signal forms training data for the machine-learning algorithm for the in-vehicle perception module.

In some embodiments, the step of generating S104 the supervisory signal comprises processing the first output by means of a secondary machine learning algorithm trained to generate a second output. Then, the supervisory signal comprises the second output, and the obtained S101 one or more images and the supervisory signal forms training data for the machine-learning algorithm for the in-vehicle perception module.

In some embodiments, the second output comprises at least one of object classifications (e.g. in the form of a classified attention map), bounding boxes, depth estimations, segmentation masks, predicted object trajectories, and so forth.

In more detail, the secondary machine-learning algorithm is configured to ingest the output from the self-supervised ML algorithm (and optionally the obtained S101 one or more images) to generate/form a second output. The output from the self-supervised ML algorithm, which may be in the form of attentions, features, depths, etc., may accordingly used to form a second output in the form of e.g., classifications, bounding boxes, segmentation masks, and so forth. Thus, the output from the secondary machine-learning algorithm 36 may be a post-processed version of the first output (e.g. classified attention maps).

However, in some embodiments, the secondary machine-learning algorithm is configured to ingest the generated S103 first output and the obtained S101 one or more images to generate the second output. Thus, the second output may be in the form of a post-processed version of the obtained S101 one or more images that are generated by using the generated S103 first output together with the obtained S101 one or more images. For example, the secondary machine-learning algorithm may be trained to generate/form bounding boxes directly on the obtained one or more images with the aid of the generated S103 first output from the self-supervised machine-learning algorithm.

Further, in some cases the self-supervised machine-learning algorithm may be presented with images from novel scenarios that are out-of-domain or far away from the data previously "seen" by the self-supervised machine-learning algorithm. Accordingly, there may be a risk of enforcing detrimental updates of the machine-learning algorithm for the in-vehicle perception module (and of the self-supervised machine-learning algorithm). In order to mitigate this risk, it is herein proposed to utilize an anomaly detection function. This potential problem is envisioned to be more prominent during the initial period after a release of the ADS onto new ODDs, and due to the inherent abilities of the self-supervised machine-learning algorithm it is envisioned that the self-supervised machine-learning algorithm will be exposed to less and less "novel scenarios" over time.

Thus, in some embodiments, the method S100 further comprises detecting S108 anomalous image data by using a machine-learning classification system trained to distinguish new experiences from experiences known to the self-supervised machine-learning algorithm in the obtained one or more images and to output an anomaly value, and calculating/adding S109 a weight to the supervisory signal based on the anomaly value. In some embodiments, the machine-learning classification system comprises an autoencoder (such as e.g., a Variational Autoencoder) trained on the same dataset as the self-supervised machine-learning algorithm, and wherein the anomaly value is a reconstruction error.

Accordingly, in some embodiments, a machine-learning classification system, for example, an autoencoder, is trained to assess the experiences a vehicle encounters (depicted in the obtained one or more images) and to classify the experiences as new (meaning new or rare) experiences or as known (meaning previously used to configure or develop the self-supervised machine-learning algorithm) experiences. Advantageously, by using an autoencoder, the reconstruction error properties of the autoencoder can be used to exaggerate anomalous scenarios captured by the vehicle's on-board sensor(s) which allows anomalies representing new or rare experiences to be detected with more sensitivity than other machine learning data classification models may be capable of at the same level of computational complexity. In other words, it is possible to determine more accurately when a new or rare experience has been encountered by a vehicle by using an autoencoder machine learning model.

In more detail, by using an autoencoder algorithm, anomalous behaviour can be more easily detected S108 as the reconstruction error will exaggerate input data that was not included in the training data of the self-supervised machine-learning algorithm. Any suitable autoencoder model algorithm can be used providing it has sufficient input dimensionality to process at least the obtained S101 one or more images representing either a scenario and/or a buffer of data, for example, a 30-second buffer of image data. By training the autoencoder using the training data used to configure and/or develop the self-supervised machine-learning algorithm, any new data not included in the training data for the autoencoder should be distinguishable from the training data in the decoded output of the autoencoder by having a larger reconstruction error.

In some embodiments, a threshold is set for the reconstruction error to distinguish output from the decoding layer of the autoencoder which was not included in the training data for the autoencoder (and consequently for the self-supervised machine-learning algorithm) and which may be classified as an anomaly from output which was included in the training data. Any suitable autoencoder model may be used.

Moreover, the reconstruction error may be used to calculate/determine S109 the "anomaly value" and consequently the weight that is added to the supervisory signal. For example, a large reconstruction error will lead to a low weight that is added to the supervisory signal. In some embodiments, a large reconstruction error (over a threshold) results in a disablement of the supervisory signal, i.e. if the obtained one or more images lead to a large enough reconstruction error, the update S107 of the one or more model parameters of the machine-learning algorithm for the in-vehicle perception module may be skipped for that cycle. In some embodiments the "weight" is a value between 0 and 1 where a larger reconstruction error results in a weight closer to 0 in comparison with a smaller reconstruction error, which results in a weight closer to 1 that is added to the supervisory signal. The term "added" in the context of "adding a weight to the supervisory signal" may be understood as multiplied, or simply that the supervisory signal is "weighted" with the calculated S109 weight value, as readily understood by the skilled person in the art.

Moreover, the machine-learning classification system is preferably updated jointly with the self-supervised machine-learning algorithm so that the two networks maintain consistency with respect to the consumed training data.

Further, in some embodiments a Federated learning (FL) scheme may be utilized, where the method S100 comprises transmitting S110 the updated one or more model parameters of the self-supervised machine-learning algorithm and the updated one or more model parameters of the machine-learning algorithm for the in-vehicle perception module to a remote entity. The method S100 may accordingly further comprise receiving S111 a set of globally updated one or more model parameters of the self-supervised machine-learning algorithm from the remote entity. The set of globally updated one or more model parameters of the self-supervised machine-learning algorithm are based on information obtained from a plurality of vehicles comprising a corresponding self-supervised machine-learning algorithm. Similarly, a set of globally updated one or more model parameters of the machine-learning algorithm for the in-vehicle perception module from the remote entity are received S112. The set of globally updated one or more model parameters of the machine-learning algorithm for the in-vehicle perception module are based on information obtained from a plurality of vehicles comprising a corresponding machine-learning algorithm for the in-vehicle perception module.

The method S100 may further comprise updating S113 the self-supervised machine-learning algorithm based on the received set of globally updated one or more model parameters of the self-supervised machine-learning algorithm, and updating S114 the machine-learning algorithm for the in-vehicle perception module based on the received set of globally updated one or more model parameters of the machine-learning algorithm for the in-vehicle perception module.

In general, the phrase "one or more model parameters" in reference to the obtaining or receiving steps as used herein serves to encompass embodiments where a version of the associated ML algorithm is already available at the receiving entity, wherefore only the updated model parameters (e.g. network weights and/or biases) need to be available in order to update the entire ML algorithm. Thereby bandwidth utilization may be improved. However, as readily understood by the skilled reader, in some embodiments all of the model parameters of the associated ML algorithm is transmitted/received or otherwise communicated.

Executable instructions for performing these functions are, optionally, included in a non-transitory computer-readable storage medium or other computer program product configured for execution by one or more processors.

Figure 3:
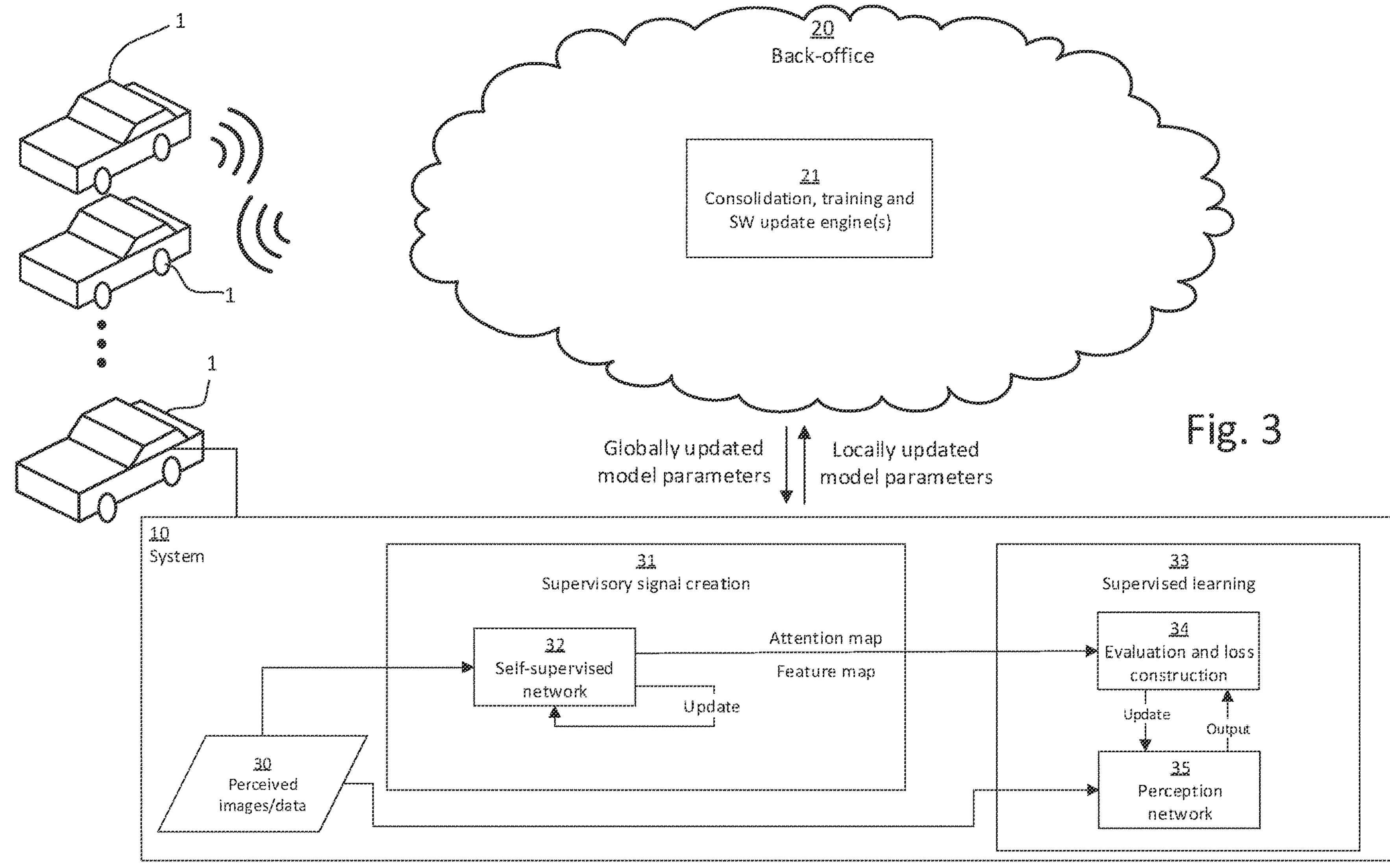
FIG. 3 is a schematic block diagram of a system for updating a perception function of an ADS-equipped vehicle in accordance with some embodiments.
Figure 4:
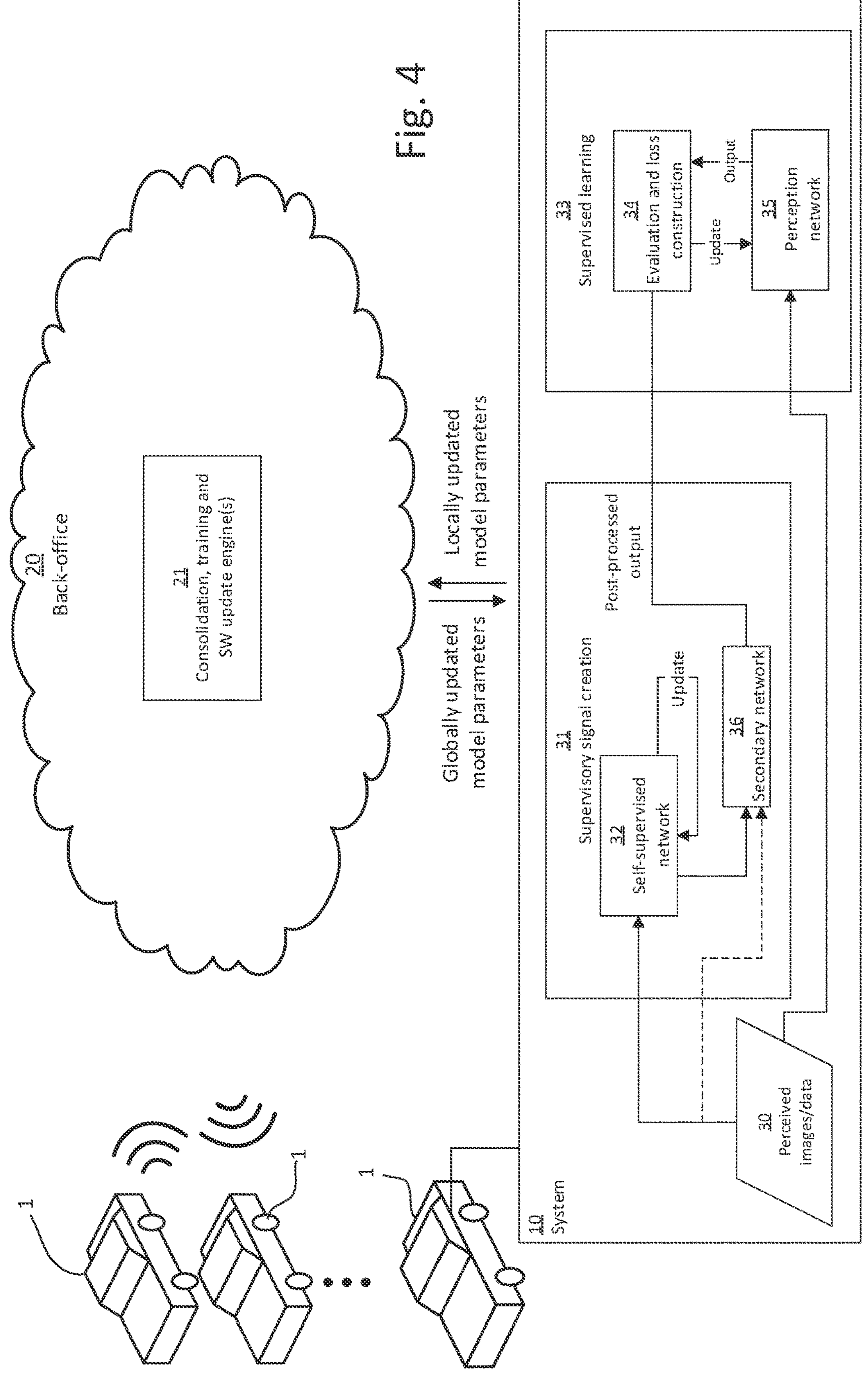
FIG. 4 is a schematic block diagram of a system for updating a perception function of an ADS-equipped vehicle in accordance with some embodiments.

FIGS. 3 and 4 are schematic block diagram representations of a system 10 for updating a perception function of vehicle 1 in accordance with some embodiments. In more detail, FIGS. 3 and 4 serve to further elucidate the above-described embodiments related to update procedure of the "production network" 35 by schematically illustrating the flow of information and the various process steps. The processing system 10 comprises control circuitry (e.g. one or more processors) configured to perform the functions of the method S100 disclosed herein, where the functions may be included in a non-transitory computer-readable storage medium or other computer program product configured for execution by the control circuitry. However, in order to better elucidate the present invention, the control circuitry is represented as various "modules" or blocks 31, 33 in FIGS. 3 and 4, each of them linked to one or more specific functions of the control circuitry. In particular, FIG. 3 depicts some embodiments where the output from the self-supervised machine-learning algorithm is used (more or less directly) to form the supervisory signal for the subsequent update process of the machine-learning algorithm for the in-vehicle perception module (i.e. "production network" or "perception network") 35. Whereas FIG. 4 depicts some embodiments, where the output from the self-supervised machine-learning algorithm is post-processed by means of a secondary ML algorithm 36, whose output is then used to form the supervisory signal.

The system 10 is capable of transmitting and receiving data to/from a remote entity, here in the form of a "back-office" or fleet management system 20. Cellular communication technologies may be used for long range communication between the vehicle 1 and the remote entity 20. Examples of cellular radio technologies are GSM, GPRS, EDGE, LTE, 5G, 5G NR, and so on, also including future cellular solutions. However, as readily understood by the skilled reader other communication technologies such as Wifi/Ethernet are feasible.

Details related to the type of networks and their architectures, network updating/training processes, etc. have been discussed in detail in the foregoing, and will for the sake of brevity and conciseness not be repeated again with respect to FIGS. 3 and 4. It is presumed that the person skilled in the art readily understands that the corresponding examples and features discussed in the foregoing are analogously applicable with respect to FIGS. 3 and 4.

The system 10 is suitable for updating a perception function of a vehicle having an Automated Driving System (ADS). The ADS has a self-supervised machine-learning algorithm 32 configured to generate an output based on one or more ingested images and a machine-learning algorithm 35 for an in-vehicle perception module trained to provide one or more perception functions based on one or more ingested images. As mentioned previously, the ADS of the vehicle 1 employs a "production network" (see e.g. ref 35) for the various operational tasks of the ADS, and in particular the "production network" is used to provide one or more perception functions (e.g. object detection, semantic segmentation, object classification, free-space estimations, lane boundary detection, tracking functions, prediction functions, end-to-end functions such as joint detection+tracking+prediction, etc.) for the decision and control functions of the ADS. Thus, the purpose of the self-supervised network 32 is predominantly to support the training/updating procedure of the production network 35.

The system 10 comprises control circuitry (see e.g. ref 11 in FIG. 5) configured to obtain one or more images 30 of a scene in a surrounding environment of the vehicle. The control circuitry is further configured to update one or more model parameters of the self-supervised machine-learning algorithm 32 in accordance with a self-supervised machine learning process based on the obtained one or more images. As mentioned, the self-supervised machine-learning algorithm may be trained by manipulating (e.g. withholding) parts of an image and instructing the algorithm to reconstruct the manipulated image as part of its learning process.

Further, the control circuitry 11 is configured to generate a first output by processing the obtained one or more images by means of the self-supervised machine-learning algorithm, and to generate a supervisory signal for a supervised learning process based on the first output.

As depicted in FIG. 4, in some embodiments, the control circuitry 11 is configured to process the first output by means of a secondary machine learning algorithm 36 trained to generate a first output comprising a post-processed version of the generated first output. Accordingly, the supervisory signal may comprise the second output. In other words, the second machine learning algorithm 36 is configured to ingest the first output (i.e. the output from the self-supervised ML algorithm 32), which may be in the form of features, attentions, depths, etc. and to produce a second output that forms the supervisory signal, which may be in the form of classifications, bounding boxes, segmentation masks, object trajectories, etc. Optionally, the second machine learning algorithm 36 may ingest the obtained one or more images 30 in addition to the first output to generate the second output. Thus, the output from the secondary machine-learning algorithm 36 may be a post-processed version of the first output (e.g. classified attention maps). Alternatively, the output from the secondary machine-learning algorithm may comprise a post-processed version of the obtained one or more images 30 that are generated by using the first output together with the obtained one or more images 30. For example, the secondary machine-learning algorithm 36 may generate bounding boxes directly on the obtained one or more images with the aid of the output from the self-supervised machine-learning algorithm 32.

The control circuitry 11 is further configured to update one or more model parameters of the machine-learning algorithm 35 for the perception module based on the obtained one or more images and the generated supervisory signal in accordance with the supervised learning process. In more detail, the obtained one or more images 30 and the corresponding output from the self-supervised network 32 (or the post-processed version thereof) serves as a training pair for the machine-learning algorithm 35 for the perception module. Thus, the output generated by the machine-learning algorithm 35 for the perception module is compared with the supervisory signal in order to form a loss function or cost function (e.g. by means of an evaluation and loss construction module 32), whereupon an optimization algorithm can be employed to minimize the loss function and updated the model parameters accordingly.

Further, in some embodiments, the control circuitry 11 may be configured to employ a machine-learning classification system to detect anomalous image data (not shown). In particular, the machine-learning classification system is trained to distinguish new experiences from experiences known to the self-supervised machine-learning algorithm 32 in the obtained one or more images 30 and to output an anomaly value. This anomaly value (e.g. reconstruction error if the machine-learning classification system is an autoencoder), may then be used to add a weight to the supervisory signal. Thereby, the potential negative impact of erroneous learning may be reduced if there is reason to believe that the output from the self-supervised network is of low quality.

The system 10 may also be arranged to adopt a federated learning scheme. In more detail, in some embodiments, the control circuitry 11 is configured to transmit the (locally) updated model parameters of the self-supervised machine-learning algorithm 32 and the machine-learning algorithm 35 for the perception module to a remote entity (e.g. a central processing system) 20. The remote entity may receive several locally updated model parameters from a plurality of vehicles 1, and control circuitry 21 configured to consolidate these local updates and form globally updated versions of the ML algorithms. The globally updated model parameters may subsequently pushed out to the fleet of vehicles 1.

Figure 5:
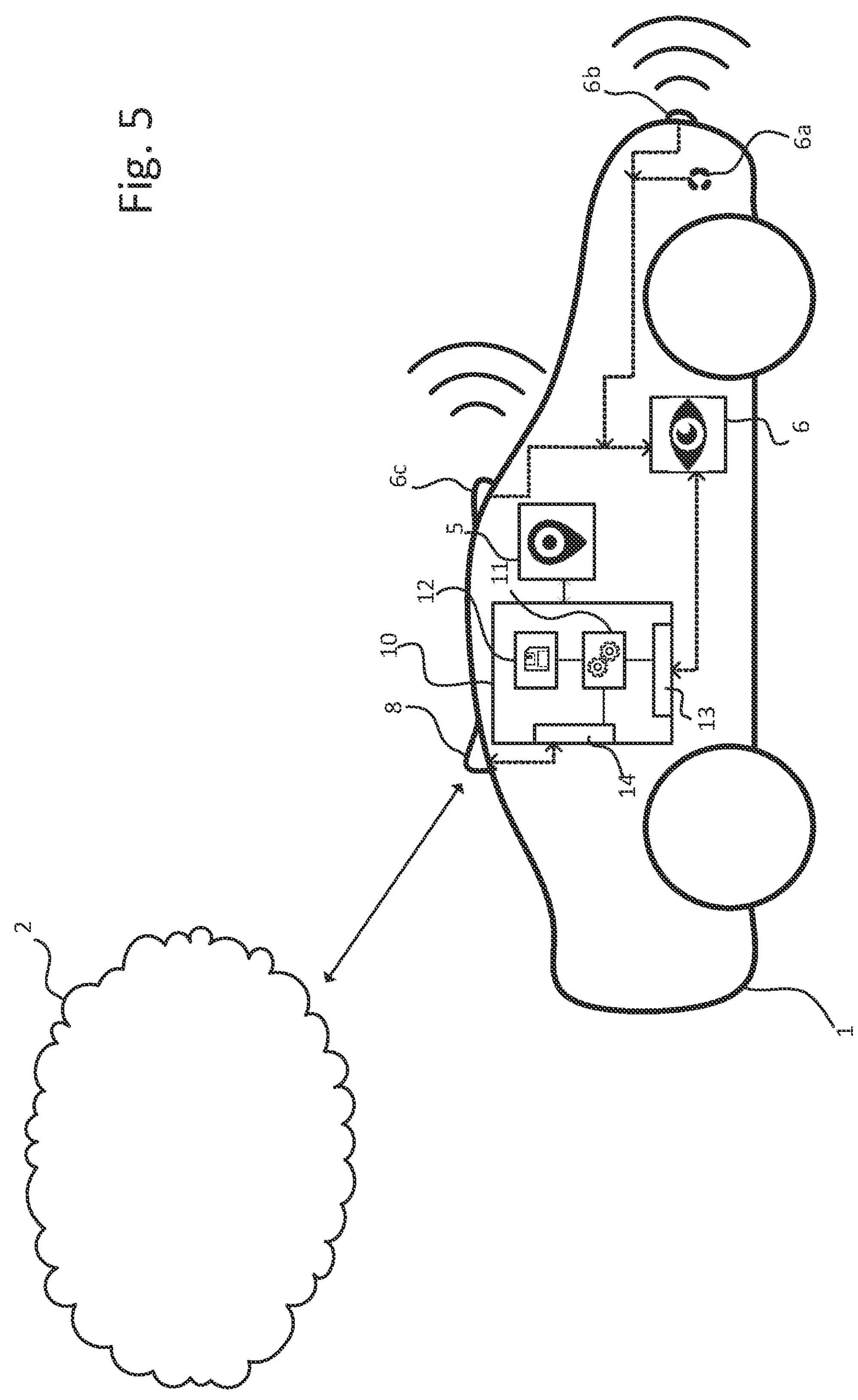
FIG. 5 is a schematic illustration of a vehicle comprising a system for updating a perception function of an ADS-equipped vehicle in accordance with some embodiments.

FIG. 5 is a schematic side view of an ADS-equipped vehicle 1 comprising a system 10 for updating a perception function of the ADS in accordance with some embodiments. The system 10 comprises one or more processors 11, a memory 12, a sensor interface 13 and a communication interface 14. The processor(s) 11 may also be referred to as a control circuit 11 or control circuitry 11. The control circuitry 11 is configured to execute instructions stored in the memory 12 to perform a method for updating a perception function of a vehicle having an Automated Driving System (ADS) according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The system 10 may also comprise suitable sensor interfaces 13 and communication interfaces 14 as known in the art.

In some embodiments, the vehicle 1 comprises a perception system 6 or perception block 6, and a localization system 5. A perception system 6 is in the present context to be understood as a system responsible for acquiring raw sensor data from on-board sensors 6*a*, 6*b*, 6*c* such as cameras, LIDARs and RADARs, ultrasonic sensors, and converting this raw data into scene understanding. The machine-learning algorithm for the perception module may be comprised by the perception system 6, and the perception system 6 as such may be part of the ADS platform. The localization system 5 is configured to monitor a geographical position and heading of the vehicle, and may be in the form of a Global Navigation Satellite System (GNSS), such as a GPS. However, the localization system may alternatively be realized as a Real Time Kinematics (RTK) GPS in order to improve accuracy.

Further, the vehicle 1 may be connected to external network(s) 20 via for instance a wireless link (e.g. for retrieving map data). The same or some other wireless link may be used to communicate with other vehicles 2 in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

In summary, and in accordance with the technology disclosed herein, self-supervised networks are deployed locally in an ADS-equipped vehicle. The network can then continuously (or at least while being parked if computational resources are unavailable during operations) ingest the scenes (images) experienced by the ADS for self-supervised learning. However, for real-time operation the ADS employs a separate "production" network that is locally updated using the output from the self-supervised network as a supervisory signal in accordance with a supervised learning scheme. Furthermore, the process may be further adopted in a federated learning scheme where the local updates from a fleet of such vehicles are consolidated centrally and pushed out as global updates of the two networks.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the system 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The device may also have a communication/antenna interface 13 that may further provide the possibility to send output to a remote location (e.g. remote operator or control centre) by means of the antenna 8. Moreover, some sensors in the vehicle may communicate with the system 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A computer-implemented method for updating a perception function of a vehicle having an Automated Driving System (ADS) having a self-supervised machine-learning algorithm configured to generate an output based on one or more ingested images and a machine-learning algorithm for an in-vehicle perception module trained to provide one or more in-vehicle perception functions based on one or more ingested images, the method comprising:

obtaining one or more images of a scene in a surrounding environment of the vehicle;

updating one or more model parameters of the self-supervised machine-learning algorithm in accordance with a self-supervised machine learning process based on the obtained one or more images;

generating a first output by processing the obtained one or more images by using the self-supervised machine-learning algorithm;

generating a supervisory signal for a supervised learning process based on the first output; and updating one or more model parameters of the machine-learning algorithm for the in-vehicle perception module based on the obtained one or more images and the generated supervisory signal in accordance with the supervised learning process.

2. The method according to claim 1, wherein the generated supervisory signal comprises the generated first output, and wherein the obtained one or more images and the generated supervisory signal forms training data for the machine-learning algorithm for the in-vehicle perception module.

3. The method according to claim 1, wherein the generating of the supervisory signal comprises processing the first output by using a secondary machine learning algorithm trained to generate a second output based on the generated first output;

wherein the supervisory signal comprises the second output;

wherein the obtained one or more images and the supervisory signal forms training data for the machine-learning algorithm for the in-vehicle perception module.

4. The method according to claim 3, wherein the second output comprises at least one of object classification, depth estimation, bounding box, segmentation mask, and object trajectory.

5. The method according to claim 1, further comprising:

detecting anomalous image data by using a machine-learning classification system trained to distinguish new experiences from experiences known to the self-supervised machine-learning algorithm in the obtained one or more images and to output an anomaly value;

adding a weight to the supervisory signal based on the anomaly value.

6. The method according to claim 5, wherein the machine-learning classification system comprises an autoencoder trained on the same dataset as the self-supervised machine-learning algorithm, and wherein the anomaly value is a reconstruction error.

7. The method according to claim 1, further comprising:

transmitting the updated one or more model parameters of the self-supervised machine-learning algorithm and the updated one or more model parameters of the machine-learning algorithm for the in-vehicle perception module to a remote entity;

receiving a set of globally updated one or more model parameters of the self-supervised machine-learning algorithm from the remote entity, wherein the set of globally updated one or more model parameters of the self-supervised machine-learning algorithm are based on information obtained from a plurality of vehicles comprising a corresponding self-supervised machine-learning algorithm;

receiving a set of globally updated one or more model parameters of the machine-learning algorithm for the in-vehicle perception module from the remote entity, wherein the set of globally updated one or more model parameters of the machine-learning algorithm for the in-vehicle perception module are based on information obtained from a plurality of vehicles comprising a corresponding machine-learning algorithm for the in-vehicle perception module;

updating the self-supervised machine-learning algorithm based on the received set of globally updated one or more model parameters of the self-supervised machine-learning algorithm; and updating the machine-learning algorithm for the in-vehicle perception module based on the received set of globally updated one or more model parameters of the machine-learning algorithm for the in-vehicle perception module.

8. The method according to claim 1, wherein the self-supervised machine-learning algorithm is a Masked Autoencoder (MAE).

9. The method according to claim 1, wherein the one or more in-vehicle perception functions comprises at least one of:

a semantic segmentation function, an instance segmentation function, an object classification function, an object detection function, a free-space estimation function, and a tracking function, an object trajectory prediction function.

10. A non-transitory computer-readable storage medium comprising instructions which, when executed by a computing device, causes the computer to carry out the method according to claim 1.

11. A system for updating a perception function of a vehicle having an Automated Driving System (ADS) having a self-supervised machine-learning algorithm configured to generate an output based on one or more ingested images and a machine-learning algorithm for an in-vehicle perception module trained to provide one or more perception functions based on one or more ingested images, the system comprising control circuitry configured to:

obtain one or more images of a scene in a surrounding environment of the vehicle;

update one or more model parameters of the self-supervised machine-learning algorithm in accordance with a self-supervised machine learning process based on the obtained one or more images;

generate a first output by processing the obtained one or more images by using the self-supervised machine-learning algorithm;

generate a supervisory signal for a supervised learning process based on the first output; and update one or more model parameters of the machine-learning algorithm for the perception module based on the obtained one or more images and the generated supervisory signal in accordance with the supervised learning process.

12. The system according to claim 11, wherein the control circuitry is further configured to:

detect anomalous image data by using a machine-learning classification system trained to distinguish new experiences from experiences known to the self-supervised machine-learning algorithm in the obtained one or more images and to output an anomaly value; and adding a weight to the supervisory signal based on the anomaly value.

13. The system according to claim 12, wherein the machine-learning classification system comprises an auto-encoder trained on the same dataset as the self-supervised machine-learning algorithm, and wherein the anomaly value is a reconstruction error.

14. A vehicle comprising:

one or more sensors configured to capture images of a scene in a surrounding environment of the vehicle; and a system according to claim 11.

* * * * *